United States Patent [19]
DenBleyker

[11] 3,870,412
[45] Mar. 11, 1975

[54] SLIDE PROJECTOR

[76] Inventor: John R. DenBleyker, 644½ E. 10th St., Holland, Mich. 49423

[22] Filed: Apr. 16, 1973

[21] Appl. No.: 351,315

[52] U.S. Cl. ............................... 353/109, 353/113
[51] Int. Cl. ...................... G03b 23/08, G03b 23/12
[58] Field of Search ............ 353/108, 109, 110, 113

[56] References Cited
UNITED STATES PATENTS

| 552,663 | 1/1896 | Hudson | 353/109 |
| 2,196,918 | 4/1940 | Hepworth | 353/109 |
| 2,986,968 | 6/1961 | Kropp | 353/95 |
| 3,632,200 | 1/1972 | Frey | 353/109 |
| 3,729,254 | 4/1973 | Frey | 353/109 |

*Primary Examiner*—Richard E. Aegerter
*Assistant Examiner*—A. J. Mirabito
*Attorney, Agent, or Firm*—McGarry & Waters

[57] ABSTRACT

A slide projector adapted to receive a continuous chain of slides comprises a continuously operating drive mechanism that engages the chain of slides and moves the slides through the slide projector; and a control mechanism that disengages the drive mechanism and stops the chain of slides as each slide reaches its proper viewing position in the projector. The control mechanism comprises a rotatable paddle wheel and cam arrangement. The blades on the paddle wheel engage projections on the chain of slides corresponding to each slide in the chain, such that movement of the slides through the projector rotates the paddle wheel. The cam mechanism associated with the paddle wheel stops the paddle wheel each time a slide reaches its proper viewing position in the projector. When the paddle wheel stops, the slides are stopped, and a slip clutch associated with the drive mechanism disengages the drive mechanism. A solenoid actuated by an appropriate command serves to temporarily release the cam mechanism and permit the slides to move through the projector until the next succeeding slide reaches its viewing position.

12 Claims, 5 Drawing Figures

PATENTED MAR 11 1975 3,870,412
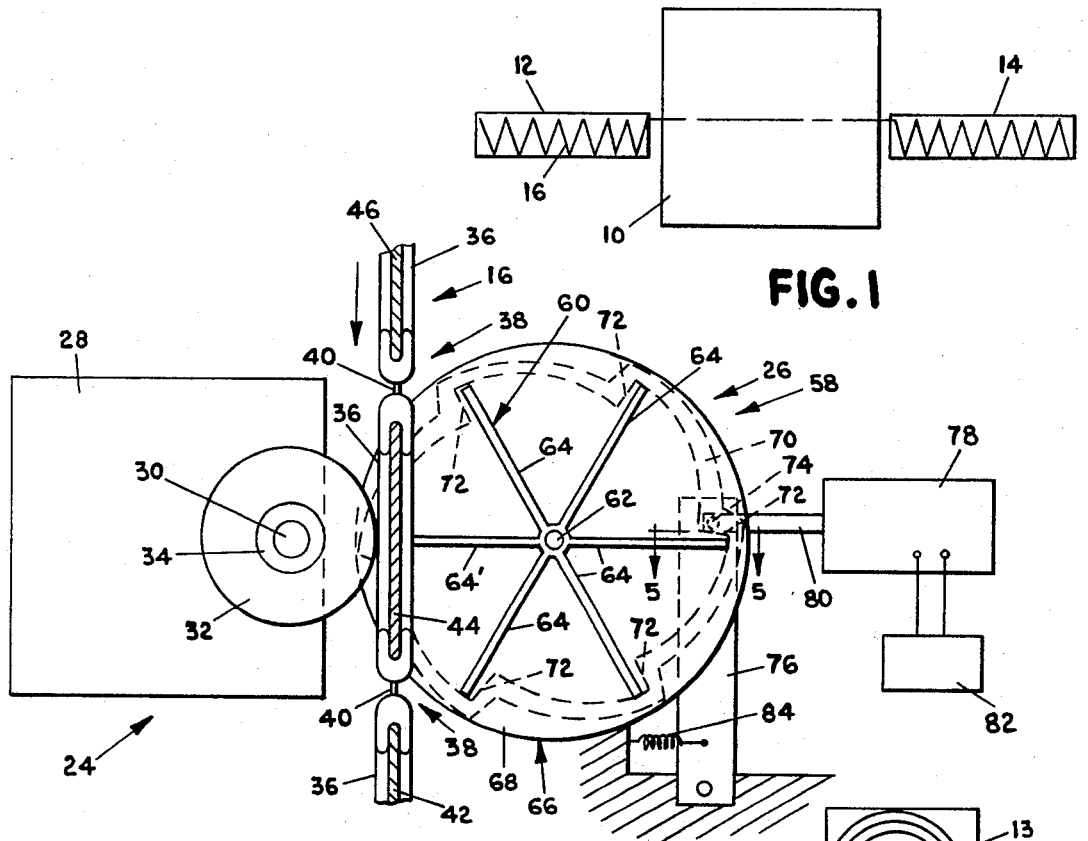
FIG.1
FIG.4
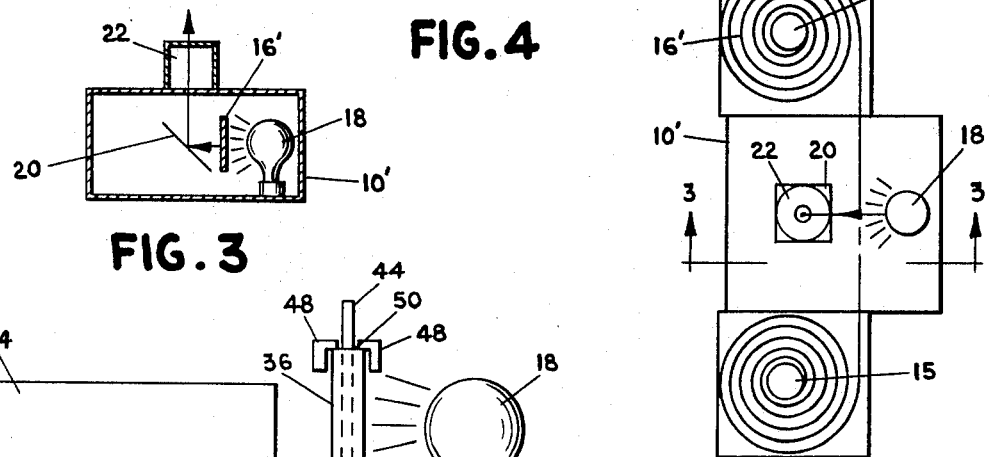
FIG.3
FIG.2
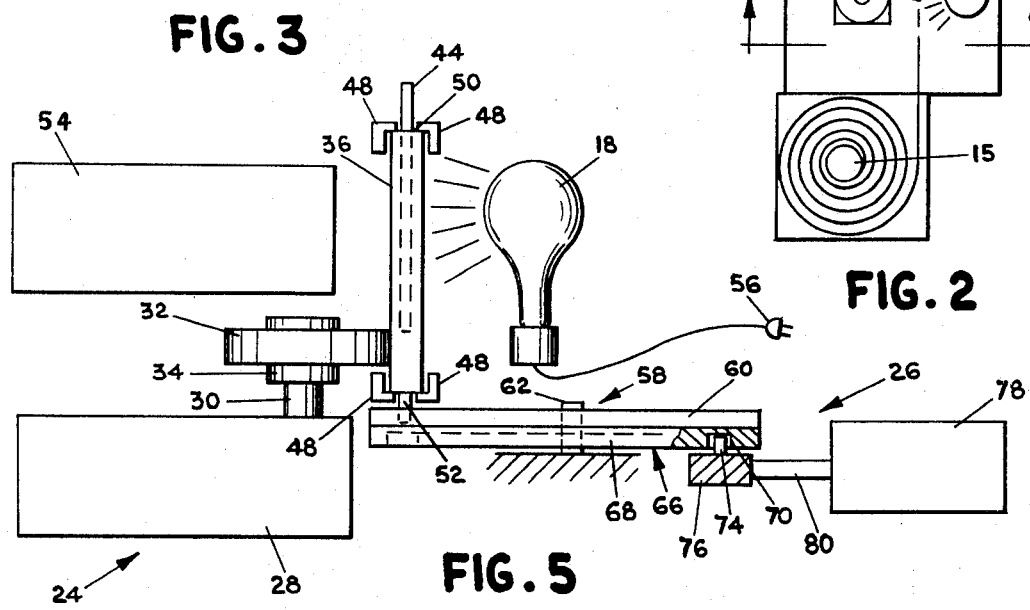
FIG.5

SLIDE PROJECTOR

BACKGROUND OF THE INVENTION

1. Field of the Invention

This invention relates to slide projectors and more particularly to slide projectors wherein slides are fed through the projector in a continuous chain by a continuously operating drive mechanism, with each slide being stopped automatically as it reaches the viewing position in the projector.

2. Description of the Prior Art

In order to improve the effectiveness and efficiency of slide projectors, attempts have been made to construct slide projectors in which the slides may be fed through the slide projector in a continuous chain by means of hinged slide holders which connect the slides together in an edge-to-edge fashion.

Heretofore, slide projectors for projecting slides mounted in a continuous chain have not been satisfactory because the drive mechanisms developed for such projectors have either been overly complicated or ineffective in moving the slides through the projector and properly positioning the slides with respect to the lens and the light source in the projector (said proper position being hereinafter referred to as the "viewing position" for the slides in the projector). One type of device heretofore employed for a continuous chain slide projector is a simple manual knob connected to a drive wheel that engages the hinged slides and moves the slides through the projector as the knob is turned. This type of device is simple and effective but naturally requires constant attention and eliminates the possibility of remote control operation.

An electrically operated device heretofore employed comprises a square drive wheel, each side of which engages the flat surface of one of the slides. The drive force employed in this type of apparatus engages the drive wheel itself and not the slides, and the amount of movement of the slides through the projector is determined, not by the position of the slides, but by the degree of rotation of the drive wheel each time the slide position is changed. One deficiency in this type of apparatus is that by applying the driving force to an intermediate wheel as opposed to the slides themselves, slippage between the slides and the drive wheel is possible. Another more serious deficiency with this type of apparatus is that the slides are difficult to position accurately in their viewing positions in the projector with the drive apparatus and the positioning apparatus tied to the amount of rotation of the drive wheel upon each successive cycle. Further, this type of slide projector is naturally designed to accommodate only one size of slide in order to have proper positioning of slides within the slide projector. Still another deficiency is that such apparatus requires drive and switching mechanisms that are machined to close tolerances in order to provide consistent slide positioning in the viewing position of the projector. Finally, such apparatus is deficient because it does not provide a means to actually stop the slide in its viewing position, but merely disengages the drive means at a time when the slide should be in its viewing position. The kinetic energy developed in the moving chain of slides may be sufficient to continue the movement of the slide at least part way past proper position for viewing in the projector.

Another type of slide projector for a continuous chain of slides comprises a ratchet and pawl mechanism that operates directly on each slide and moves the slide about a square drive wheel of the type described above. This type of mechanism, however, suffers from the same deficiencies as the foregoing apparatus, namely, the distance that each slide moves through the projector in a given cycle is determined not by the position of the slide but by the angular rotation of the drive wheel. Further, the mechanism by which the angular rotation of the drive wheel is controlled involves a complex mechanical linkage. Such a linkage would be difficult to fabricate within the close tolerances required and would be subject to malfunction and maladjustment. Another deficiency with this type of apparatus is that no means are employed to actually stop each slide when it reaches the viewing position in the slide projector. Consequently, the slides may move partially past their proper viewing positions even after the drive force has been disconnected.

It is the principal object of the present invention to overcome the foregoing deficiencies in the above-described slide projectors and to provide a slide projector wherein slides are moved through the projector in a continuous chain by a positive drive means and are stopped in their viewing positions by means of a stop mechanism which is directly responsive to the actual position of each slide with respect to the viewing position of the slide projector, not with respect to the angular position of some drive wheel or mechanical linkage remote from the viewing position in the projector.

SUMMARY OF THE INVENTION

The slide projector of the present invention is adapted for projection of slides mounted in a continuous chain and comprises a continuously operating drive means that engages the chain of slides and moves the slides through a viewing position in the slide projector; and a control mechanism that automatically stops each slide when it reaches it viewing position in the slide projector. The control mechanism is actuatable in response to an appropriate command to release the slides and re-engage the drive mechanism, thereby producing further movement of the slides through the projector until the next slide is in the viewing position. At that point, the control mechanism automatically stops the slides and disengages the drive means.

The slides are moved through the slide projector by means of a continuously operating motor which is connected through a slip clutch to a drive wheel that engages directly the chain of slides as they move through the projector. The slip clutch is responsive to resistance to slide movement through the projector, such that if the slides are stopped, the slip clutch automatically disengages the motor from the drive wheel.

The control mechanism for stopping each slide as it reaches its viewing position in the projector comprises a rotatable paddle wheel and cam arrangement. The paddle wheel includes a fixed number of radially extending blades that extend into engagement with projections that extend outwardly from the slides in the chain (or from slide holders in which the slides may be mounted), such that as the slides move through the projector, the projection corresponding to each slide engages one of the blades of the paddle wheel and causes the paddle wheel to rotate about its axis. A cam wheel mounted for rotation with the paddle wheel defines a generally circular cam path having a plurality of stop surfaces thereon corresponding to each blade in the paddle wheel. A cam follower follows the cam and engages a stop surface thereon each time a succeeding slide reaches the viewing position of the slide projector, thus stopping the paddle wheel and slides at that point. A solenoid responsive to an appropriate command disengages the cam follower from the stop surface and permits the rotation of the paddle wheel until the next succeeding slide reaches its viewing position in the projector, at which time the cam follower engages the next stop surface on the cam path and stops the paddle wheel and slides.

One of the principal advantages of the present invention is that slides are moved positively through the slide projector by means of a drive wheel that acts directly on the slides or on slide holders in which the slides are mounted. Thus, no slippage of the drive mechanism is encountered.

Another important advantage of the present invention is that each slide is affirmatively stopped in its proper viewing position in the projector.

Still another advantage of the present invention is that each slide is positioned in its viewing position in the projector by reference to the actual position of that particular slide with regard to the viewing position, not by an artificial reference to the angular movement of a wheel and without regard to any differences in the width of any succcessive slides or any other factors that would cause varying distances between successive slides in the chain.

These and other objects, advantages, and features of the present invention will appear hereinafter, and, for purposes of illustration but not of limitation, preferred embodiments of the subject invention are described below and shown in the appended drawings.

BRIEF DESCRIPTION OF THE DRAWINGS

FIG. 1 is a schematic view showing how slides attached edge-to-edge in a chain fashion may be stored in accordion fashion in magazines in each side of the projector.

FIG. 2 is a schematic view showing how slides connected edge-to-edge in a chain fashion may be stored on reels on each side of the projector.

FIG. 3 is a sectional view taken along lines 3—3 of FIG. 2.

FIG. 4 is a top view of one embodiment of a slide projector drive mechanism of the present invention, shown partially in block form and partially in schematic form.

FIG. 5 is a side view of the drive mechanism shown in FIG. 4, shown partially in section along lines 5—5 of FIG. 4.

DETAILED DESCRIPTION OF THE PREFERRED EMBODIMENT

Referring now to the drawings, the general manner in which slides mounted in a continuous chain may be employed in a slide projector is shown in FIGS. 1–3. In FIG. 1, a projector 10, shown in block form, is provided with an inlet magazine 12 and an outlet magazine 14. A continuous chain of slides 16 is mounted in accordion fashion in the inlet magazine, and the slides are fed through the projector in a straight line and are thereafter stored, again in magazine fashion, in outlet magazine 14.

FIG. 2 shows another means by which slides may be employed in a continuous chain in a slide projector. In this embodiment, a continuous chain of slides, designated by the numeral 16', is coiled on inlet reel 13 and is fed through the projector 10' to an outlet reel 15 on the other side of the projector. A light source 18 in the projector shines through each slide as it occupies its proper position between the light source and the lens of the projector (hereinafter referred to as the "viewing position" of the slide). After the light from the light source 18 passes through each slide it may be deflected by an angularly disposed mirror 20 (as shown in FIG. 3) so that it passes through a lens 22, disposed at right angles to the original direction of the light passing through the slide.

The drive mechanism of the present invention is shown in detail in FIGS. 4 and 5. Basically, this drive mechanism comprises drive means 24 and a control mechanism generally referred to as 26. The drive means comprises a motor 28 (shown in block form) and a drive shaft 30 which is continuously rotated by motor 28. Motor 28 is actuated by means of a suitable power source such as a wall outlet or the like (not shown). In the preferred embodiment of the subject invention, motor 28 is operated continuously while the slide projector is on, so that drive shaft 30 is rotating continuously in a clockwise direction (FIG. 4 orientation).

The drive force exerted by rotating drive shaft 30 is transferred to the slides themselves by means of a drive wheel 32 which is mounted on drive shaft 30 by means of a conventional slip clutch 34 (which is shown in schematic form). Slip clutch 34, which constitutes part of the control means 26, operates in the following manner: Under normal conditions, when drive wheel 32 is free to rotate, slip clutch 34 effects a driving interconnection between drive shaft 30 and drive wheel 32. When, however, the resistance to the rotation of drive wheel 30 reaches a predetermined level, slip clutch 34 automatically disengages drive shaft 30 from drive wheel 32, thus permitting drive shaft 30 to continue rotating while drive wheel 32 is stopped.

As shown in FIGS. 4 and 5, each of the slides in the preferred practice of the present invention is mounted edge-to-edge in a continuous chain 16. The continuous chain may be formed by hinged clips attached to the edges of succeeding slides or it may be formed by means of a continuous hinged slide holder into which the slides are fitted. For purposes of this illustration, the slide fastening mechansim will be described in connection with a slide holder.

Slide holder 16 comprises a series of slide receptacles 36 for slides. These slide receptacles are interconnected by means of hinged connections 38. These connections may be formed of plastic or other resilient material, with the hinge 40 of the connection constituting a thin, flexible, plastic strip between two opposing sides of the connection.

For illustration purposes, each of the slides shown in FIG. 4 are referred to by different numerals, with the bottom slide being designated by numeral 42, the middle slide being designated by numeral 44, and the top slide being designated by numeral 46. In the FIG. 4 orientation, the slides are moving in a downward direction, with slide 44 being in the viewing position in the slide projector, slide 42 having already passed through the viewing position, and slide 46 being the next succeeding slide to enter the viewing position in the projector. As shown in FIG. 5, slide holder 36 is guided through the projector by means of appropriate guide members 48, which are shown in schematic form. Each slide receptacle in the chain comprises an upper recess 50 into which the individual slides may be placed and a lower projection 52 extending downwardly from the bottom of the slide holder. In the case where the chain is formed by individual slides connected together by edge clips, the bottom projections extend from the slides themselves or from the edge clips.

When slide 44 is in the viewing position in the projector, light source 18 is in position to shine directly through slide 44 and through lens 54 which is shown in block form in FIG. 5. The image is thereafter projected to a screen or other suitable viewing surface. Light source 18 is powered by a suitable power source such as a wall outlet or the like by means of a plug 56 shown schematically in FIG. 5.

Control means 26 comprises a stop mechanism 58, which is mounted in the path of the projections on slide holders 16 and is adapted to stop each slide when it reaches the viewing position and hold the slide in its viewing position until the stop mechanism is released by an appropriate command. Such a command may be manual or it may be an automatically timed command actuated by a suitable conventional timing device.

Stop mechanism 58 comprises a paddle wheel 60 rotatably mounted on a shaft 62 at the center thereof. Paddle wheel 60 comprises a plurality of evenly spaced blades 64 which extend radially outwardly from the center of the wheel. Paddle wheel 60 is formed and positioned so that each of the blades 64 contacts a projection 52 on the bottom of each slide receptacle 36 as the chain of slides 16 moves through the projector. As the chain of slides moves through the projector, the projections cause the paddle wheel to rotate, with the engagement of one projection on one blade causing the next succeeding blade to move into the path of the next succeeding slide receptable, whereupon the projection on the next succeeding slide holder engages the next succeeding blade and causes further rotation of the paddle wheel.

Intermittent motion of the slides through the slide projector is effected by stopping paddle wheel 60 in the position shown in FIG. 4 each time a slide reaches its viewing position in the projector. By stopping paddle wheel 60, the blade in contact with the projection 52 on the slide or slide receptacle in the viewing position (i.e., blade 64') causes the chain of slides to stop, and this in turn causes disengagement of slip clutch 34. Thus, the slide is stopped in its viewing position until an appropriate release mechanism releases the paddle wheel for further rotation.

In the preferred practice of the present invention, the paddle wheel is stopped each time a blade reaches the position of the blade designated by numeral 64' in FIG. 4. A particularly successful stopping device is achieved by means of a cam mechanism 66 mounted on the underside of the rotating paddle wheel. Cam mechanism 66 comprises a cam wheel 68, which is mounted for rotation with paddle wheel 60. Cam wheel 68 has a cam path 70 formed on the underside thereof comprising a generally circular cam path around the circumference of the cam wheel 68, with the cam path having a series of stop surfaces 72 located along the path, with one stop surface being provided for each blade in the paddle wheel. As shown in FIG. 5, the cam path 70 is in the form of a vertical groove formed on the underside of cam wheel 68.

The cam wheel is stopped at each stop surface in the cam path by means of a cam follower 74, which comprises a pin member that extends upwardly from the underside of the cam wheel into the grooved cam path 70. Pin 74 is mounted on a suitable support bracket 76 and is prevented thereby from rotational movement along with cam wheel 68. Thus, as the cam wheel rotates, pin 74 follows along the cam path until it strikes a stop surface 72. At this point, a resilient spring member 84 holds the pin member against the stop surface and holds cam wheel 68 at that position until the pin is dislodged and moved away from the stop surface by actuation of a release mechanism, as described below.

Pin 74 is moved off of stop surface 72 by means of a suitably controlled release means comprising solenoid 78 (shown in block form in FIGS. 4 and 5). Solenoid 78 includes a shaft 80 that extends outwardly therefrom and is attached to the end of support bracket 76 adjacent pin 74. The other end of support bracket 76 is pivotally mounted to the chassis of the projector, in the manner shown schematically in FIG. 4. With the support bracket mounted in this manner, pin 74 may be moved in a generally radial direction with respect to cam wheel 68, but it may not rotate circumferentially along with cam wheel 68.

Solenoid 78 is actuated by an appropriate command means 82, shown schematically in the drawings, which may, as discussed above, be either an automatic timing device or a manual actuation device. The actuation of solenoid 78 causes the retraction of shaft 80 into the solenoid, and this in turn causes the support member 76 to pivot in a clockwise direction (FIG. 4 orientation). This dislodges pin 74 from stop surface 72 so that cam wheel 68 and paddle wheel 60 resume rotation about shaft 62. This in turn causes re-engagement of drive means 24 through clutch 34. Thus, drive wheel 32 causes the slides to resume their movement through the slide projector. The slides continue to move through the projector until the next slide 46 reaches the viewing position occupied by slide 44 in FIG. 4. At this point, pin member 74 has been guided by the cam path into contact with the next succeeding stop surface 72 on cam wheel 68 and stops slide 46 in its viewing position.

It would be possible to employ an alternative stopping device other than cam wheel 68 and pin 74. One such alternative possibility would be to dispense with cam wheel 68 entirely and have pin 74 extend into direct contact with the blade 64 of the paddle wheel 60. This would be a more simple arrangement but cam wheel 68 is nevertheless preferred to this alternative embodiment, because cam path 70 provides positive guidance for pin 74 into contact with the next succeeding stop surface 72. The positive guidance provided by cam path 70 is further enhanced by means of resilient spring member 84 attached to the chassis of the projector, which urges the pin member in a counterclockwise direction against stop surface 72 until an appropriate control force dislodges the pin member from the stop surface.

By providing a positive guidance path for pin member 74, the possibility of skipping a slide due to the slow return of pin member 74 to a position where it will block a blade member from rotation, is prevented. Since this is a realistic possibility in a slide projector, the control path cam mechanism is preferred to the simpler system wherein the pin simply blocks the blade member on the rotating paddle wheel.

Control mechanism 82, shown in block form in the drawings, may be manually actuated by a button or other such remote control device so that an operator could push a button actuating the solenoid and move the slides to the next slide. Alternatively, control member 82 could include a conventional timing device which would be adapted to actuate solenoid 78 automatically on a periodic basis. This timing device could include adjustment means in order to adjust the time interval between successive actuations of the solenoid, and thereby adjust the time at which each slide is projected on the screen.

One of the principal advantages of the apparatus of the present invention is that the control means operate in exactly the opposite manner of control means of conventional continuous chain slide projectors. Whereas the control means of conventional continuous chain projectors, upon actuation, are designed to actuate a driving means to move slides, hopefully, to the next succeeding slide, the drive mechanism of the present invention is continuously in engagement with the slides, and the control mechanism operates automatically to stop each slide in its exact viewing position, and automatically disengage the drive mechanism. The release of the control mechanism of the present invention, rather than starting up a driving motor or other such device, merely provides a temporary release of the stop mechanism that permits the next succeeding slide to move to its viewing position, whereupon the slides are again automatically stopped.

Therefore, one of the principal advantages of the present invention is that it stops each slide exactly in its viewing position and operates directly on the slides to affect this purpose. It does not operate on some remote gear train in the drive mechanism, and is therefore adaptable to different types of slides of different dimensions and does not become maladjusted or out of line with slippage in the gear line or by other such circumstances that can arise in a slide projector.

Another advantage of this apparatus is that the slides are positively stopped in their viewing position, whereas in prior art devices, the slides are simply moved to their viewing position and let go. Any kinetic energy developed in the chain of slides could cause the slides to glide past the viewing position, thereby requiring rewinding of the film every time a slide is moved.

Another advantage of the present invention is that slippage in the drive train and skipping of slides is virtually eliminated. Since the drive wheel is continuously in engagement with the chain of slides and need not be moved away from engagement, the drive wheel may be applied firmly against the slides. When a frictional drive member must be periodically moved away from the driving surface, it is usually necessary to use a soft spring force in order to permit easy disengagement of the drive wheel. Also, with the forced cam path in cam wheel 68, skipping of slides is virtually eliminated.

It should be understood that the embodiments of the present invention described herein are merely typical, illustrative examples of the preferred practice of the present invention and that various changes, modifications, and variations may be made in the arrangements, operations, and details of construction of the elements disclosed herein without departing from the spirit and scope of the present invention.

The embodiments of the invention in which an exclusive property or privilege is claimed are defined as follows:

1. A slide projector for projecting slides connected together in a continuous chain comprising:

A light source and lens mounted in the projector and defining a viewing position for slides therebetween;

electrically operated drive means for successively moving each slide in the continuous chain through the viewing position in the projector, said drive means being adapted upon actuation to move the slide continuously through the viewing position until deactuated;

stop means in the slide projector adapted to sense the position of each individual slide in the chain as it passes through the projector, said position being sensed independently of the position or movement of the drive means, said stop means being further adapted to automatically engage the chain of slides and stop the chain of slides each time the stop means senses a slide in the viewing position;

release means adapted to release the stop means; and control means adapted to actuate the drive means in response to the release of the stop means and to deactuate the drive means in response to the stopping of the chain of slides by the stop means.

2. A slide projector as claimed in claim 1 wherein:

the chain of slides comprises a projection corresponding to each slide in the chain;

the stop means comprises:

a rotatable paddle wheel having a fixed number of radial blades corresponding to the projections on the chain of slides, said paddle wheel being positioned so that each succeeding projection on the chain of slides engages each succeeding projection on the chain of slides engages each succeeding blade of the paddle wheel and rotates the paddle wheel as the slides are moved through the projector; and cam means associated with the rotatable paddle wheel, said cam means being adapted to stop the paddle wheel each time a slide reaches the viewing position and being temporarily releasable in response to the actuation means to release the slides and permit rotation of the paddle wheel until the next succeeding slide reaches the viewing position, at which time the cam means automatically stops the paddle wheel and the slides.

3. A slide projector as claimed in claim 2 wherein: the cam means comprises:

a cam wheel attached to and rotatable with the paddle wheel, said cam wheel comprising a cam surface defining an irregular circular path and having stop surfaces on the path corresponding to each blade in the paddle wheel; and cam follower means engaging said cam surface means and mounted so as to be prevented from rotatable movement with the cam wheel, said cam follower means being adapted to follow the cam surface path, stopping the cam wheel each time the cam follower engages a stop surface on the path; and the release means comprises solenoid means attached to the cam follower, said solenoid means being adapted, upon actuation, to move the cam follower out of engagement with the stop surface on the cam wheel, thereby permitting the cam wheel to rotate until the cam follower engages the next succeeding stop surface on the cam wheel.

4. A slide projector as claimed in claim 1 and further comprising input and output slide accordion magazine means adapted to hold the slides in accordion fashion as they are fed into and out of the projector.

5. A slide projector as claimed in claim 1 and further comprising input and output slide reel magazine means adapted to hold the slides on reels as they are fed into and out of the projector.

6. A slide projector as claimed in claim 1 wherein the slides are clipped edge-to-edge by means of hinged edge clips, said edge clips being hinged together by means of flexible plastic strips that extend between the edge clips of successive slides.

7. A slide projector as claimed in claim 1 wherein the slides are mounted in a hinged slide holder providing a slide receptacle for each slide, the slide receptacles being hinged together by means of flexible plastic strips that extend between vertical edges of successive slide receptacles.

8. A slide projector as claimed in claim 1 wherein:
the drive means comprises an electric motor having a continuously rotating output shaft and a drive wheel means engaging the chain of slides and adapted to move the slides through the viewing position when rotated in a predetermined direction; and
the control means comprises slip clutch means interconnecting the output shaft of the electric motor and the drive wheel, said slip clutch means being adapted to urge the rotation of the drive wheel in said predetermined direction in response to the rotation of the output shaft of the electric motor, the urging of the slip clutch means being sufficient to rotate the drive wheel and move the chain of slides through the projector when the stop means is released but the urging being insufficient to rotate the drive wheel when the stop means has stopped the slides.

9. A slide projector for projecting slides connected together in a continuous chain comprising:
a light source and lens means mounted in the projector so as to define a slide viewing position in the projector;
an electrical motor mounted in the projector, said motor having an output drive shaft;
means for operating the motor continuously during the operation of the projector;
a drive wheel mounted on said drive shaft by means of a slip clutch means, said slip clutch means being adapted to provide driving engagement between the drive wheel and the drive shaft, said slip clutch means becoming disengaged whenever the resistance of the drive wheel to rotation reaches a predetermined level, said drive wheel being positioned in driving engagement with the chain of slides so as to move the slides through the viewing position;
a plurality of projections extending from the chain of slides, one such projection being provided for each slide in the chain;
a paddle wheel rotatably mounted in the projector adjacent the viewing position, said paddle wheel having a set of radially disposed blades corresponding to the projections on the chain of slides, said blades extending outwardly into the path of the projections such that the movement of the slides through the projector causes the projections to engage the blades and rotate the paddle wheel;
a cam mechanism mounted for rotation with the paddle wheel, said cam mechanism comprising a circumferential cam path having stop surfaces thereon corresponding to each blade in the paddle wheel;
a non-rotatable cam follower mounted so as to follow the cam path, said cam follower being resiliently urged into engagement with each stop surface so as to stop the cam each time a slide moves into its viewing position, thus stopping the paddle wheel and the slides as well;
solenoid means connected to the cam follower and adapted to dislodge the cam follower from the stop surface upon temporary actuation so as to permit the cam mechanism and paddle wheel to rotate until the cam follower engages the next succeeding stop surface on the cam mechanism; and
actuation means adapted to actuate the solenoid.

10. A slide projector as claimed in claim 9 wherein the actuation means comprises an automatic timing mechanism that intermittently actuates the solenoid at predetermined intervals.

11. A slide projector as claimed in claim 9 wherein the actuation means comprises a manually operated actuator that actuates the solenoid in response to a manually introduced control signal.

12. A slide projector as claimed in claim 9 wherein the cam path affirmatively guides the cam follower into engagement with the next succeeding stop surface on the cam path after the cam follower is dislodged from one stop surface.

* * * * *